(12) United States Patent
O'Rourke

(10) Patent No.: US 10,570,991 B2
(45) Date of Patent: Feb. 25, 2020

(54) APPARATUS FOR QUICKLY SECURING A CABLE

(71) Applicant: Michael Aaron O'Rourke, North Huntingdon, PA (US)

(72) Inventor: Michael Aaron O'Rourke, North Huntingdon, PA (US)

(*) Notice: Subject to any disclaimer, the term of this patent is extended or adjusted under 35 U.S.C. 154(b) by 75 days.

(21) Appl. No.: 15/891,165

(22) Filed: Feb. 7, 2018

(65) Prior Publication Data

US 2018/0223954 A1 Aug. 9, 2018

Related U.S. Application Data

(60) Provisional application No. 62/456,215, filed on Feb. 8, 2017.

(51) Int. Cl.
| | | |
|---|---|---|
| *F16G 11/10* | (2006.01) | |
| *F16G 11/04* | (2006.01) | |
| *F16G 11/14* | (2006.01) | |
| *F16M 13/02* | (2006.01) | |
| *F16G 17/00* | (2006.01) | |
| *F16B 2/14* | (2006.01) | |

(52) U.S. Cl.
CPC .......... *F16G 11/048* (2013.01); *F16G 11/108* (2013.01); *F16G 11/143* (2013.01); *F16M 13/02* (2013.01); *F16B 2/14* (2013.01); *F16G 17/00* (2013.01)

(58) Field of Classification Search
CPC .... F16G 11/048; F16G 11/108; F16G 11/106; F16G 11/143; F16G 11/14; F16G 11/105; F16G 11/10; F16B 2/14; F16B 2/16; Y10T 24/3969; Y10T 403/5793; Y10T 24/3996; Y10T 403/76; Y10T 24/3973; Y10T 24/318; B60P 7/0823
USPC .................... 24/136 R, 136 A, 115 I, 115 M
See application file for complete search history.

(56) References Cited

U.S. PATENT DOCUMENTS

| 307,806 A | 11/1884 | Sailer |
|---|---|---|
| 1,333,375 A | 3/1920 | Davis |
| 3,007,220 A | 11/1961 | Hafner et al. |
| 4,807,333 A | 2/1989 | Boden |

(Continued)

FOREIGN PATENT DOCUMENTS

| GB | 117677 | 11/1917 |
|---|---|---|
| GB | 143967 | 6/1920 |

(Continued)

*Primary Examiner* — Jack W Lavinder
(74) *Attorney, Agent, or Firm* — Kevin P. Weldon

(57) ABSTRACT

The present invention is a metal cable locking mechanism for allowing the cable to pass through the locking mechanism in one direction but grips the metal cable when it is attempted to be removed from the locking mechanism in the opposite direction. The locking mechanism includes a housing having a through passageway for receiving the cable, a tapering internal cavity, wherein a wheel and spring are positioned within the internal cavity, the spring biasing the wheel toward a narrower end of the internal cavity. The wheel is wedged between the cable and an internal cavity ramp whenever a force is applied to the cable attempting to withdraw the cable. A releasing device can be manually inserted into a slot passage to force the wheel away from the narrower end of the internal cavity so that the locking mechanism will ungrasp the cable.

14 Claims, 3 Drawing Sheets

(56) References Cited

U.S. PATENT DOCUMENTS

| | | | | |
|---|---|---|---|---|
| 4,860,408 | A | * | 8/1989 | Johnson ................ B60P 7/0823 |
| | | | | 24/68 CD |
| 5,471,713 | A | | 12/1995 | Alter et al. |
| 5,655,623 | A | | 8/1997 | Skyba |
| 6,049,950 | A | * | 4/2000 | Cavallo ................. F16G 11/101 |
| | | | | 24/170 |
| 2009/0236460 | A1 | | 9/2009 | Bourke et al. |
| 2010/0038611 | A1 | * | 2/2010 | Lambourn ............. A01K 3/005 |
| | | | | 256/53 |
| 2010/0260464 | A1 | | 10/2010 | Ayme et al. |
| 2011/0041292 | A1 | * | 2/2011 | Jolly ..................... F16G 11/106 |
| | | | | 24/136 R |
| 2011/0041569 | A1 | | 2/2011 | Yu et al. |
| 2014/0251062 | A1 | | 9/2014 | Snodgrass |
| 2015/0267774 | A1 | | 9/2015 | Somerfield |

FOREIGN PATENT DOCUMENTS

| | | | |
|---|---|---|---|
| GB | 2275728 | 7/1994 | |
| GB | 2548921 | 4/2017 | |
| WO | WO-2011135126 A1 * | 11/2011 | .............. F16G 11/14 |
| WO | WO 2015/155516 | 10/2015 | |

* cited by examiner

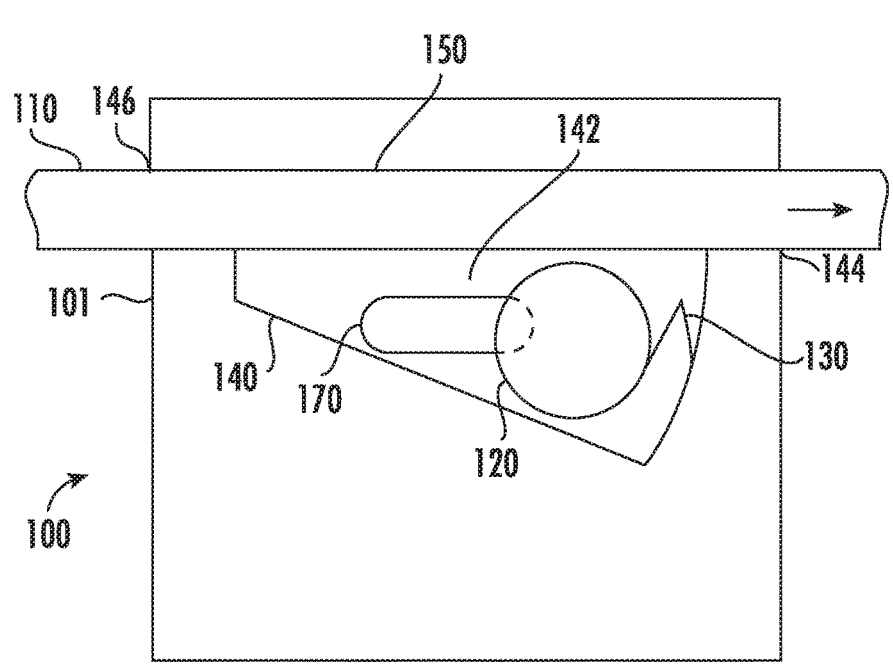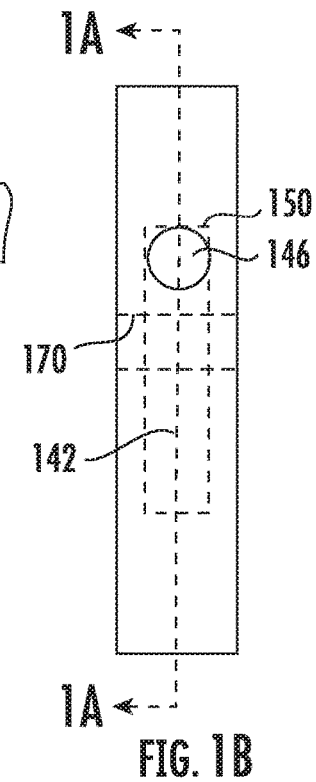
FIG. 1A   FIG. 1B
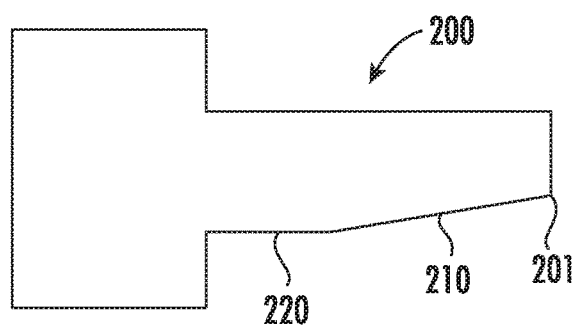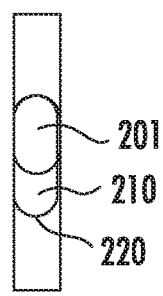
FIG. 2A   FIG. 2B

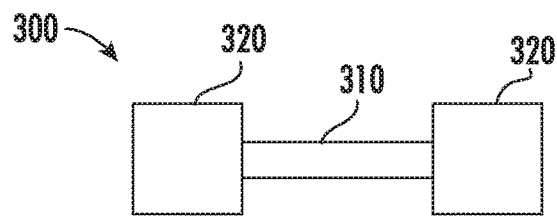
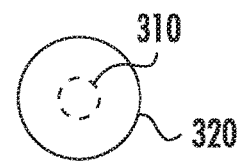
FIG. 3A   FIG. 3B
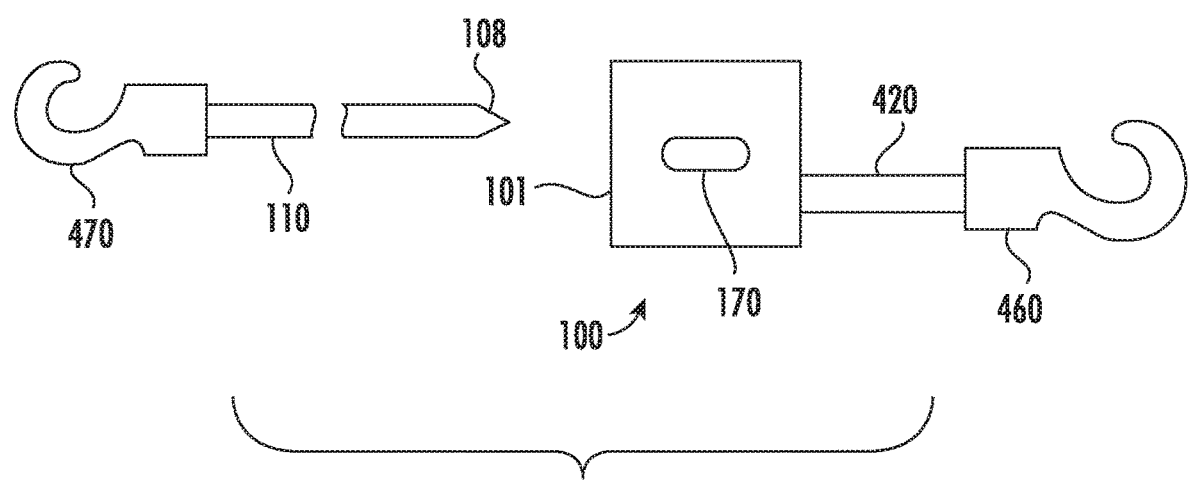
FIG. 4

APPARATUS FOR QUICKLY SECURING A CABLE

RELATED APPLICATIONS

This patent application claims the benefit of priority to Provisional Patent Application No. 62/456,215, filed Feb. 8, 2017, entitled "Rugged Strap" and is also incorporated by reference.

FIELD OF THE INVENTION

This invention relates to a general-purpose adjustable length cable for temporarily securing miscellaneous objects in place.

BACKGROUND OF THE INVENTION

There are numerous apparatus in the industry for temporality fastening and retaining a line in position. The lines are often made from cord, rope, wire, steel cable or other material. Among prior art steel cable fastener technology, steel cable has been affixed to objects using clips, clamps, sleeves or crimp fittings, many of the prior art methods of coupling and fastening steel cable are either time consuming or require cumbersome tools or both.

Particularly out in the field there is a need for an apparatus that enables a person to quickly fasten and then unfasten a steel cable without the need for cumbersome and/or special tools. Once fastened the steel cable needs to be able to remain fastened in position. The strength of hold on the steel cable should be at least commensurate with the strength of the cable.

In the prior art many devices are employed for fastening cord into a fixed position that are manually employed without the need for a tool to crimp, swage or clamp the cord to the fastener, see U.S. patents: U.S. Pat. No. 307,806 (Sailer), U.S. Pat. No. 1,333,375 (Davis), U.S. Pat. No. 3,007,220 (Hafner et al), U.S. Pat. No. 480,733 (Boden and U.S. Pat. No. 5,471,723 (Alter et al.). However, such cords disclosed therein have limited strength and are unsuitable for situations demanding a strong line.

Ratchet straps are commonly used for securing objects in transit or in temporary installations. Examples include the following Item Numbers available from US Cargo Control (www.uscargocontrol.com): 5012WH-Y, 5027CE-Y, and BL8530FH. Other examples are McMaster-Carr part numbers 9116T61 and 9116T64. Ratchet straps typically have metal hooks for connection of the end-points, and metal ratchet parts, but use polymer webbing as the flexible element that is retracted to change the working length. For some applications, particularly in harsh environments, the polymer webbing is a disadvantage since it is vulnerable to stresses such as mechanical abrasion, chemical attack, or weakening by heat or ultraviolet rays.

In other prior art seals are employed to fasten together cable in a loop. The seal is generally made for a one-time use, the seal is constructed so that the cable can only be removed by breaking the seal material, typically a thermoplastic, and then removing the cable. A cable security seal such as item code MS-05.0-54K from NovaVision Inc. of Bowling Green, Ohio includes a wire-rope cable and a locking mechanism that allows the cable to be set up as an adjustable-length loop while providing a strong hold on the cable.

Master Lock Company LLC of Oak Creek Wis. sells an adjustable locking cable under the trademark Python; examples are product numbers 8418D and 8413KA. These cables are more rugged than ratchet straps because they include a steel core. The cable is locked into position using a common everyday pin tumbler lock mechanism. Such lock and key mechanisms are well known in the art, but pin tumbler locks and are more complex and expensive to fabricate.

In the field it is often desirable to fasten a line about an object or objects so as to bundle and/or fix the object(s) to a stationary object. There is a need for a strong and durable apparatus that can be quickly and conveniently looped and fastened together and just as quickly and conveniently unfastened in the field.

SUMMARY OF THE INVENTION

The present invention is a metal cable locking mechanism for allowing the cable to pass through the locking mechanism in one direction, but grips said metal cable when it is attempted to be removed from the locking mechanism in the opposite direction. The locking mechanism includes a housing having a through passageway for receiving said cable, a tapering internal cavity, a slot passage substantially orthogonal to said through passageway, wherein a wheel and spring means are positioned within said internal cavity, said spring means biasing said wheel toward a narrower end of said internal cavity. The wheel is wedged between the cable and an internal cavity ramp whenever a force is applied to the cable attempting to withdraw the cable. The cable becomes gripped between the wheel and housing. A releasing device can be manually inserted into the slot passage to force the wheel away from the narrower end of the internal cavity so that the locking mechanism will ungrasp the cable.

In a preferred embodiment of the invention for an adjustable length cable system, the embodiment includes a locking mechanism having an integral hook. The system further includes a second part having a cable having a first end that is inserted, and temporality fixed within a locking mechanism and a hook fixed at the end opposite of the cable.

In the adjustable cable system of the present invention the locking mechanism may either include a cable releasing handle assembled directly thereon or in an alternative embodiment employ a separate releasing tool that is inserted into the locking mechanism, so the cable becomes ungrasped and the releasing tool may be removed so that the cable may be gripped when a force is applied attempting to withdraw the cable.

The present invention is a ladder securing system for attaching a ladder to a tree or similar object. The system includes a ladder and a first part having a locking mechanism having an integral hook. The system further includes a second part including a cable having a first end and a hook fixed at the opposite end of the cable. The hooks of the first part and second part are attached to openings positioned on opposite sides of a ladder step.

Other objects and advantages of the present invention will become apparent from the detailed description of the preferred embodiments which follow, when read in conjunction with the drawings.

BRIEF DESCRIPTION OF THE DRAWINGS

FIG. 1a is a cross-sectional view of the cable locking mechanism invention showing a portion of a cable that is inserted therein FIG. 1b is an end view of the housing part of the locking mechanism embodiment shown in FIG. 1a of the invention.

FIG. 2*a* is a separate release tool that may be inserted by a user within a receiving slot on the locking mechanism of the invention to unfasten a cable from the locking mechanism.

FIG. 2*b* is an end view of the release tool means illustrated in FIG. 2*a*.

FIG. 3*a* illustrates a side view of an alternative release means, this release handle is assembled onto the housing of the locking mechanism of the present invention.

FIG. 3*b* is an end view of the embodiment shown in FIG. 3*a*

FIG. 4 illustrates an adjustable cable system including a locking mechanism with an integral hook of the present invention and a separate cooperating cable having hook at one end.

DESCRIPTION OF THE PREFERRED EMBODIMENTS

Figure 5:
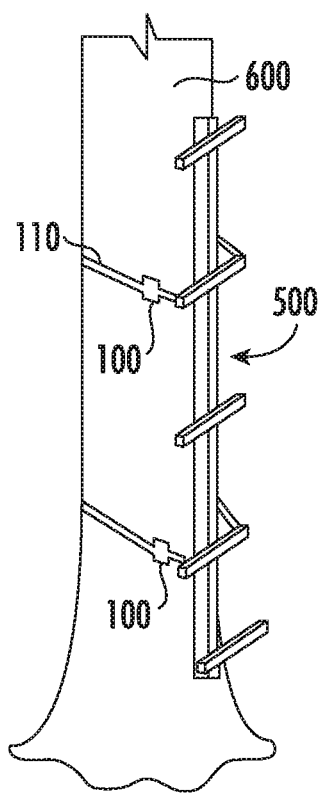
FIG. 5 is a perspective view of a ladder fastened to a tree trunk using the present invention.
Figure 6:
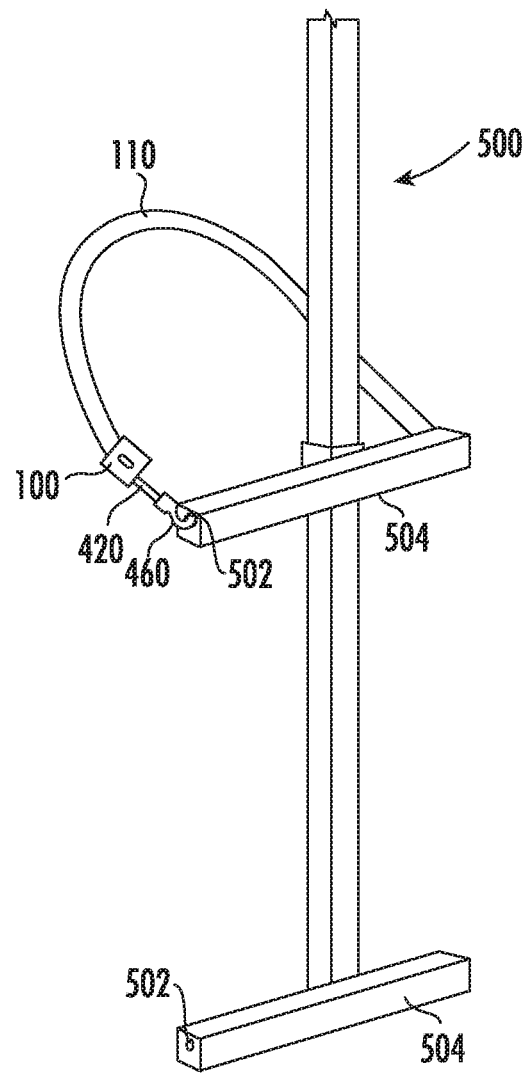
FIG. 6 is a truncated perspective view of the present invention ladder fastening system shown in FIG. 5.

FIG. 4 shows an adjustable cable system the permits a user to conveniently connect and vary the length of steel cable between two hooks. A user inserts steel cable 110 into a locking mechanism 100 until a desired length is achieved, the cable once inserted into the locking mechanism cannot be withdrawn in the opposite direction, rather it is gripped within the locking mechanism should it be attempted to be removed or adjusted. The release tool 200 shown in FIG. 2*a* permits a user to readily unfasten the cable hook 470 from locking mechanism 100 by simply inserting release tool 200 into slot passage 170.

The cable locking mechanism 100 has a hook 460 integrally fixed to the housing 101. A separate hooked cable 110 is provided with tapered end 108 and a first hook 470. Tapered end 108 facilitates insertion of cable 110 into a through passageway in housing 101. The second hook 460 in one preferred embodiment may be permanently fixed to the housing 101 via a short length of metal cable 420 that may be welded within the housing 101 at one end and welded to the hook 460 at its opposite end.

Referring now to FIG. 1 the details of the locking mechanism will be discussed. A locking mechanism 100 allows motion of a cable 110 in the direction of the arrow shown, but can prevent movement in the opposite direction. If the cable is pulled in the opposite direction it is gripped and locked within the housing. Cable 110 is inserted through a passageway in housing 101 that extends from one end of the housing to an opposite end of the housing. The housing 101 has an internal cavity 142 for receiving a spring clip 130 and wheel 120. Other spring means well-known in the art may be substituted for the illustrated spring clip for biasing the wheel 120.

The internal cavity 142 has two circular openings, insert opening 146 and exit opening 144. The openings 144, 146 are coaxially aligned and are at opposite ends of the housing 101. The circular openings 144, 146 permit a cable 110 to be inserted completely through the locking mechanism as shown in FIG. 1*a*.

FIG. 1*b* shows the insert end of just the housing without any representation of the wheel, cable or spring. The slot passage 170 and internal cavity 142 are both represented by phantom lines in FIG. 1*b*. The width of the wheel 120 is only slightly smaller than the width of the internal cavity 142 exhibited by the phantom lines in FIG. 1*b* so as to stop the wheel from substantially tilting. Upward motion of the cable 110 is primarily prevented by top surface 150 of the internal cavity. Wheel 120 is pressed by spring 130 toward a narrowing gap bounded between cable 110 and ramp 140. Wheel 120 is not fixed in just one position within the internal cavity 142. The wheel may rotate, roll and/or move about within the internal cavity 142.

Motion of cable 110 in the direction opposite to that of the arrow shown, i.e., "to the left in the FIG. 1*a*," assists spring 130 to push wheel 120 toward the narrow end of the tapered gap formed between cable 110 and ramp 140. This motion of the cable 110 toward the narrowing direction of the internal cavity 142 along with the spring 130 forces the wheel 120 to move toward the ramp 140. As the wheel 110 moves over and "up" the ramp the gap between the wheel and cable gets smaller and smaller. A very slight movement of the cable in the narrowing direction of the cavity 142 compresses the wheel wedging it in the tapered gap between the cable 110 and ramp 140. The wheel is compressed until the friction force applied to the cable equals the external force pulling the cable out of the locking mechanism 100. The friction forces on the cable are attributable to where the cable contacts the wheel 120 and contacts housing 101 surfaces. The gripped cable primarily abuts against the top surface 150 of internal cavity. The wedged wheel 120 prevents the cable 110 from being released from the locking mechanism 100.

A rounded rectangle slot passage 170 is formed through the housing 101 below the cable 110. The slot passage is generally orthogonal to the axial passage for receiving the cable 110. The slot passage is so formed in the housing 100 so that it provides access to the pinching portion of the internal cavity forward of the wheel 120 when cable 110 is inserted. The slot passage 170 permits external access to the internal cavity 142 and is used to push wheel 120 in the expanding direction of the cavity 142. The wheel 120 can be moved in the expanding direction until the wheel is no longer wedged between the cable 110 and ramp 140. The wheel 120 is advanced in the expanding direction so that it no longer contacts both the ramp 140 and the cable 110. Once the releasing tool 200 is completed inserted into the slot 170 and the releasing tool throat 220 abuts against the wheel 120 the cable 110 can be removed from locking mechanism 100 or the length of the cable can be adjusted as desired. Motion of cable 110 in the direction of the arrow shown in FIG. 1*a* does not cause any compression of the wheel. Upon insertion of the releasing tool 200 the length of the cable 110 can be adjusted shorter and shorter by continually pushing the cable 110 into the locking mechanism (in the direction of arrow in FIG. 1*a*) via opening 146 until a desired length is achieved. As the cable 110 moves in this direction the gap between cable 110 and ramp 140 increases and expands, therefor the cable 110 movement does not cause any wedging or compression of the wheel. When the desired length is achieved the releasing tool 200 is removed from the slot and the cable 110 is gripped.

FIGS. 2*a* and 2*b* show a preferred embodiment of a release tool 200 that is adapted for inserting into slot 170 of FIG. 1. The width of narrow end 201 is chosen to be sufficiently narrow so that it clears the wheel 120 while passing through slot 170. Throat 220 of the tool 200 is of a size and shape that nearly fills slot 170, thereby forcing wheel 120 in the expanding direction at least a predetermined distance; the predetermined distance is selected so as to guarantee that a definite clearance arises between the cable 110 and the wheel 120. Inclined surface edge 210 on tool 200 provides a mechanical advantage to reduce the amount of manual force required during insertion of tool 200 into slot 170. When the tool 200 is inserted in the slot the inclined edge 210 causes a predetermined progressive movement of the wheel 120 in the expanding direction that gradually reduces the compressive force applied to the cable. Once the tool 200 is completely inserted into the slot 170 the wheel 120 will no longer be compressed between the cable 110 and ramp 140. The cable 110 can now be pulled out of opening 146 and removed from the locking mechanism 100.

As can be appreciated the releasing tool 200 offers additional security from vandalism and/or theft of objects fastened by the cable, particularly whenever the cable locking mechanism is used out in the field. The releasing tool 200 may be employed like a common key. The key operator just takes the key with them away from the locked cable and brings it back for insertion into the slot 170 whenever it is desired to release the lock mechanism and remove the cable.

The wheel 120 and housing 101 may be made from a hardened steel to minimize wear caused by moving contact between the wheel 120, housing ramp 140 and cable 110 during use of the locking mechanism. Similarly, tool 200 is preferably made of hardened steel to minimize wear on inclined surface edge 210 due to moving contact with wheel 120. Alternatively, in other preferred embodiments other hard metals as well as other high strength wear resistant materials may be employed in manufacturing the invention.

FIG. 3 illustrates another alternative releasing means to the releasing tool 200 shown in FIG. 2a. A release handle 300 comprises shaft 310 having a diameter slightly smaller than the minor dimension of slot 170 of FIG. 1a. Release handle 300 is assembled onto locking mechanism 100, by extending shaft 310 through slot 170. The knobs 320 are connected to both shaft 310 ends on opposite sides of the housing 101. The knobs 320 are assembled onto the shaft 310 so as to provide a small clearance between the housing 101 and knobs 320 enabling a user to slide the release handle 300 back and forth in slot 170. In a free state, with no external manual forces applied to knobs 320, handle 300 floats within slot 170 when the wheel 120 is wedged into its locking position. As seen in FIG. 1a, the slot 170 is generally located toward the narrow end of the internal cavity so that the handle 170 is assembled onto a side of the wheel 120 opposite the side where spring 130 is positioned within the cavity 142.

Accordingly, a user can release the cable 110 by manually pushing the knobs along the slot 320 in the expanding direction toward wheel 120. The shaft 310 makes contacts with the wheel 120 moving the wheel away from tapering gap between cable 110 and ramp 140 and against the spring bias. While manually holding the wheel handle so that the wheel 120 is no longer wedged between cable 110 and ramp 140 a person may pull and remove the cable 110 completely out of the locking mechanism 100. This built on locking mechanism handle 300 for releasing the cable alleviates the requirement of a separate tool such as release tool 200.

The adjustable cable system shown in FIG. 4 (and incorporating the releasing means shown in FIG. 2) can be employed in a ladder securing system as shown in FIG. 5. The ladder has a plurality of elongated rectangular hollow metal steps 504. Adjacent the opposite ends of each step 504 are openings 502 for receiving the hooks in FIG. 4. The openings are shown as being located near enough the end of the steps so as to enable the hooks 460 and 470 to be easily connected to the step. By connecting the cable near the ends of the steps on the ladder more stability is provided to the ladder than if for instance a cable is just strapped about the central axial post (unnumbered) of the ladder 500. This improved stability attributed to connecting the cable to the ends of the step allows for greater safety whenever a person climbs up the ladder.

A user of the invention may first properly orient the ladder 500 against a tree 600 insert and attach first hook 470 into an opening 502 at one end of a step 504 and then insert and attach second hook 460 into an opening 502 at the opposite end of the step 504. Next a user wraps the 110 cable about the tree trunk and inserts the free end 108 of the cable into opening 146 of the locking mechanism 100. Finally, the user either pushes or pulls the cable through the locking mechanism housing an adequate amount so that the cable 110 firmly hugs the tree as shown in FIG. 5. The cable 110 now having been adjusted to firmly hug the tree can now be slightly pulled away from the insert opening 146, as this is done the wheel 120 is wedged into locking position and the cable is gripped. The ladder is now securely held in place and ready for climbing. The cable 110 now locked tight by the wedging wheel cannot be withdrawn from the locking mechanism 100 without first inserting the release tool 200.

In a preferred embodiment the steel cable may have a diameter in the range between $1/16"-1/8"$, in another preferred embodiment the steel cable may have a diameter of $1/16"$, $3/32"$ or $1/8"$. These steel cable diameters are adequate to withstand the weight of at least a 200$lb$ person climbing the tree attached ladder.

While certain novel features of this invention have been shown and described, it is not intended to be limited to the details above, since it will be understood that various omissions, modifications, substitutions and changes in the forms and details of the illustrated invention and in its operation, can be made by those skilled in the art without departing in any way from the spirit of the present invention.

The claimed invention is:
1. An adjustable cable system comprising:
a metal cable having a hook fixed at one end, and
a locking mechanism including a housing having a through passageway for receiving said cable, a tapering internal cavity, a slot passage substantially orthogonal to said through passageway,
wherein an axle-less disc wheel and spring means are positioned within said internal cavity, said spring means biasing said wheel toward a narrower end of said tapering internal cavity,
a releasing means for cooperating with said slot passage, and
a hook integrally fixed to said housing.
2. An adjustable cable system according to claim 1, wherein said releasing means is a release handle.
3. An adjustable cable system according to claim 1, wherein said releasing means is a release tool.
4. An adjustable cable system according to claim 3, wherein said release tool fits into said slot passage, and
said release tool having an inclined surface edge.
5. An adjustable cable system according to claim 4, wherein during manual insertion of said release tool into said slot, said inclined edge causes said wheel to progressively move away from said narrower end of said tapering internal cavity, once said release tool is fully inserted said wheel is disengaged from said cable and said cable may be removed from said locking mechanism.
6. An adjustable cable system according to claim 5, wherein said wheel, said housing and said release tool are made from hardened metal.

7. An adjustable cable system comprising
a metal cable having a hook fixed at one end, and
a locking mechanism including a housing having a through passageway for receiving said cable, a tapering internal cavity, a slot passage substantially orthogonal to said through passageway, wherein an axle-less disc wheel and spring means are positioned within said internal cavity, said spring means biasing said wheel toward a narrower end of said tapering internal cavity, wherein said internal cavity has a ramp and a top surface, said top surface adjacent and substantially parallel to said cable when inserted into said through passageway,
wherein whenever said cable is subjected to forces pulling said cable out of said locking mechanism, said wheel is compressed between said ramp and said cable, whereby said cable is forced against said top surface by said wheel, and
a release tool, wherein said release tool fits into said slot passage, and
said release tool having an inclined surface edge.

8. An adjustable cable system according to claim 7, wherein during manual insertion of said release tool into said slot, said inclined edge causes said wheel to progressively move away from said narrower end of said tapering internal cavity, once said release tool is fully inserted said wheel is disengaged from said cable and said cable may be removed from said locking mechanism.

9. An adjustable cable system according to claim 8, further comprising a hook integrally fixed to said housing.

10. An adjustable cable system according to claim 9, wherein said wheel, said housing and said release tool are each made from hardened metal.

11. A ladder securing system comprising:
a metal cable having a first hook fixed on one end,
a ladder,
a locking mechanism including a housing having a through passageway for receiving said cable, a tapering internal cavity including a ramp, and a top surface, said top surface adjacent and substantially parallel to said cable when inserted into said through passageway a slot passage substantially orthogonal to said through passageway, wherein an axle-less disc wheel and spring means are positioned within said internal cavity, said spring biasing said wheel toward a narrower end of said tapering internal cavity,
a separate releasing tool, said releasing tool fits into said slot, said releasing tool may be inserted into said slot wherein said tool abuts against said wheel and said cable can be removed from said locking mechanism or adjusted as desired when said tool is completely inserted into said slot, once the cable is adjusted to a desired length the releasing tool is removed from the slot and said spring biases said wheel against said cable,
said wheel is wedged and gripped between said ramp and said cable upon movement of said cable in a narrowing direction of the tapering internal cavity,
a second hook integrally fixed to said housing.

12. A ladder securing system according to claim 11, wherein said ladder has a plurality of steps, at least one of said plurality of steps is an elongated element having two opposite ends,
said opposite ends each have an opening one said end opening for receiving said first hook and the other said end opening for receiving said second hook,
wherein said ladder can be fastened about a tree with said cable and said hooks, and
said releasing tool is a separate key that may be removed from said locking mechanism to lock the cable and whenever it is desired to remove the ladder from said tree said key is reinserted into said slot to force said wheel in an expanding direction of said internal tapering cavity ungrasping said cable,
said key offering security against vandalism.

13. An adjustable cable system comprising:
a metal cable having a hook fixed at one end, and
a locking mechanism including a housing having a through passageway for receiving said cable, a tapering internal cavity, a slot passage substantially orthogonal to said through passageway, wherein an axle-less disc wheel and spring means are positioned within said internal cavity, said spring means biasing said wheel toward a narrower end of said tapering internal cavity,
a separate releasing tool, said releasing tool fits into said slot passage, said releasing tool may be inserted into said slot passage wherein said tool abuts against said wheel and said cable can be removed from said locking mechanism or adjusted as desired when said tool is completely inserted into said slot passage, once the cable is adjusted to a desired length the releasing tool is removed from the slot and said spring biases said wheel against said cable,
said wheel is wedged and gripped between said ramp and said cable upon movement of said cable in a narrowing direction of the tapering internal cavity,
a second hook integrally fixed to said housing.

14. An adjustable cable system according to claim 13, further comprising a hook integrally fixed to said housing.

* * * * *